No. 666,157. Patented Jan. 15, 1901.
A. F. RIETZEL.
ELECTRIC WELDING APPARATUS.
(Application filed Sept. 28, 1900.)
(No Model.)
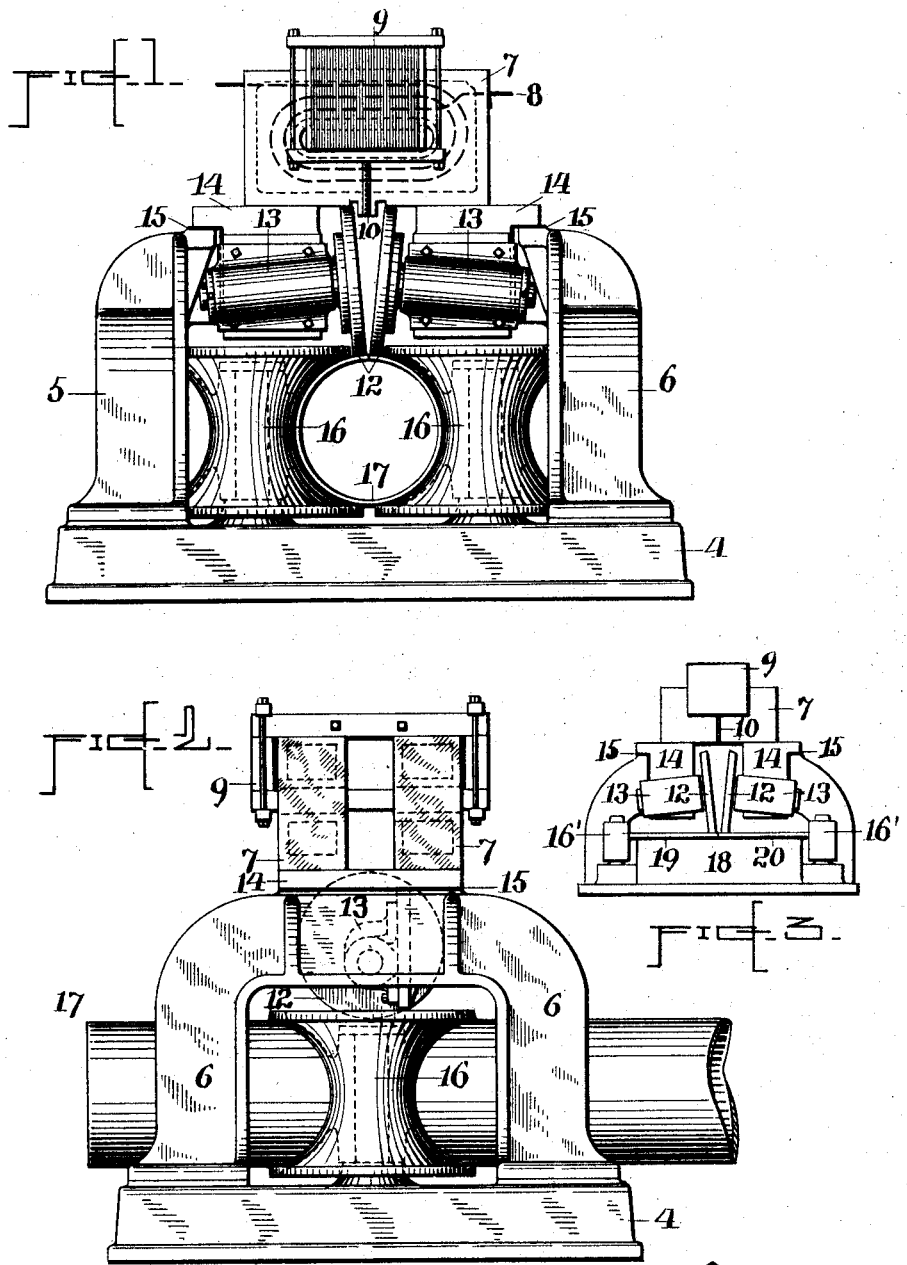
Witnesses:
Otto Greenberg
E. L. Lawler
Inventor
Adolph F. Rietzel
By
H. Townsend
Attorney.

UNITED STATES PATENT OFFICE.

ADOLPH F. RIETZEL, OF LYNN, MASSACHUSETTS, ASSIGNOR TO THE THOMSON ELECTRIC WELDING COMPANY, OF SAME PLACE.

ELECTRIC WELDING APPARATUS.

SPECIFICATION forming part of Letters Patent No. 666,157, dated January 15, 1901.

Application filed September 28, 1900. Serial No. 31,385. (No model.)

*To all whom it may concern:*

Be it known that I, ADOLPH F. RIETZEL, a citizen of the United States, and a resident of Lynn, in the county of Essex and State of Massachusetts, (post-office address care of Thomson Electric Welding Company, Lynn, Massachusetts,) have invented certain new and useful Improvements in Electric Welding Apparatus, of which the following is a specification.

This invention relates to the construction of that class of electric metal-working apparatus in which the work is heated by the passage of an electric current and welded, upset, or otherwise operated upon or manipulated while the work is in motion. My invention, however, is designed more particularly for use in electric welding of tubes, cylinders, pressure-tanks, and other forms of work which are made from sheet metal pressed or formed into their respective shapes and welded along the seams. The apparatus is also adapted for welding together two or more strips, sheets, or plates of metal, edge to edge, in any desired length.

My invention consists, further, in a novel construction of the apparatus wherein the work to be welded is practically out of the field or magnetic circuit of the conductors, thus giving a more uniform heat and taking less current to do the welding.

In apparatus heretofore constructed for progressively welding seams the work as it is fed forward is entirely within the free magnetic field of the transformer-conductors, thus causing a considerable loss of energy. Tubular work when occupying this position, particularly if the tubes be of any considerable size, compels the working terminals of the transformer secondary to be placed at a considerable distance from the turn or turns of the secondary, thereby unduly and extravagantly prolonging the secondary-circuit.

In the present improvement the objects are to keep the working terminals as near as possible to the turn or turns of the secondary and to keep the work outside of the space inclosed by the conductor constituting the secondary of the transformer. Apparatus adapted to accomplish these objects is illustrated in the accompanying drawings, wherein—

Figure 1 is a front elevation of the apparatus in which my invention is embodied. Fig. 2 is a side elevation of the same. Fig. 3 is a front elevation in outline simply to indicate the modification in structure whereby the apparatus is adapted to welding plates together.

This improvement being especially designed for application to tubes or pipes, that form of apparatus for doing this work will first be described. Therefore, referring to Figs. 1 and 2, 4 indicates the base of the apparatus. 5 and 6 indicate upright frames or abutments at the sides of the base, upon which the welding-transformer is removably mounted. This transformer has a well-known form of secondary, (indicated at 7,) which, if desired, may be duplicated, as shown in the side view in Fig. 2. It consists of a hollow rectangular receptacle adapted to contain oil, in which the primary coil is placed. This transformer is of the type commonly known as the "oil-transformer" because of this formation of the secondary and location of the primary. The primary is indicated in Fig. 1 by the heavy broken line 8. The core of the transformer is indicated at 9 and is of well-known construction. The ends of the secondary are suitably insulated, as indicated at 10. The working terminals of the secondary of the transformer are of disk form, as indicated at 12. These disks or rolls 12 are juxtaposed, with their faces toward each other and converging toward the sides thereof farthest from the secondary. These terminals are carried by axles which in turn are journaled in bearings 13, which are vertically adjustable upon the polar extensions 14 of the secondary 7.

The transformer is insulated from its supports 5 and 6, as indicated at 15. Suitable concave pressure-rolls are shown at 16 as mounted upon vertical bearings, and between them is passed the tube to be welded. Said tube is indicated at 17. The seam in the tube is at the top and the disk-like working terminals of the transformer roll along at the sides of the seam. The axles carrying these working terminals are located at such an angle as will allow the full surface of the disks 12 to engage the tube 17. The tube 17 may be forced or drawn through the apparatus between the rolls 16 in any well-known way. Its progress is so timed that the seam shall be perfectly welded as the tube advances. The welding current passes from one pole of the secondary through one of the disks 12, with which the edge of the tube is engaged, thence across the seam and through the adjacent edge of the tube into the other terminal 12, and so back to the turn or turns of the secondary, the transformer in this instance consisting simply of one turn in each secondary, or, if you choose, the transformer may be said to have two secondary turns in parallel, both being joined to the same pole-pieces or polar extensions 14. The rolls 16 may be made adjustable to and from one another to accommodate different-sized tubes. This adjustability also provides for the decrease in the size of the disks 12, due to the grinding out of pits formed therein during the welding operation. Should a variation in the diameter of the tubes or other work exceed the capacity of a certain machine, then the transformer may be moved onto a base which shall be of a size adequate for said work. In this way one transformer may be made to serve on several different bases, said bases varying in the height of the supports 5 and 6 and in the distance between the feet of said supports. The same transformer is also adapted for use upon plates that are to be welded together, as indicated in Fig. 3. The base for the support of the transformer in that case would be substantially as shown in said figure—that is, it would have a suitable support, as 18, for the plates, which are indicated at 19 and 20, and the rolls 16' might be simply cylindrical rolls against which the outer edges of the plates might pass, said rolls being so located with respect to the working terminals 12 as to maintain the seam in the proper position and give the desired pressure to the abutting edges of the plates.

The details of construction of the apparatus may be considerably varied from the forms above described without at all affecting the invention herein claimed.

I claim as my invention—

1. In an electric metal-working apparatus adapted to weld a seam while the work is in motion, the combination with a suitable support for the moving work, of a welding-transformer the entire secondary circuit of which is at one side of the work, whereby the work is practically outside of the magnetic circuit of the conductors and the circuit of the secondary is at its minimum length.

2. In an electric metal-working apparatus adapted to weld a seam while the work is in motion, the combination with a suitable support for moving the work, of a welding-transformer the entire secondary circuit of which is at one side of the work, said transformer being removably mounted upon said support and adapted to be shifted and applied to supports varying in capacity.

3. In an electric metal-working apparatus adapted to weld a seam while the work is in motion, the combination with the transformer provided with rotary, disk, working terminals mounted on polar extensions of the secondary as closely as possible to the turn or turns of the secondary, and a support for the work and for the transformer whereby the secondary and its working terminals are all at one side of the work substantially as and for the purpose set forth.

4. In an electric metal-working apparatus the combination with the transformer secondary of disks or rolls journaled on the ends of the secondary and converging at the sides thereof farthest from the secondary, and means for supporting the work exterior to the rolls, for the purpose set forth.

5. In an electric metal-working apparatus the combination with the transformer secondary of a pair of juxtaposed disks or rolls mounted respectively upon the ends of the secondary and arranged to press the work between the edges thereof remotest from the transformer, substantially as set forth.

Signed at Lynn, in the county of Essex and State of Massachusetts, this 25th day of September, A. D. 1900.

ADOLPH F. RIETZEL.

Witnesses:
ELIHU THOMSON,
DUGALD MCKILLOP.